(12) United States Patent
Alperin et al.

(10) Patent No.: US 8,170,189 B2
(45) Date of Patent: May 1, 2012

(54) CROSS-PLATFORM MESSAGE NOTIFICATION

(75) Inventors: Jordan Alperin, Denver, CO (US); John Verbil, Scottsdale, AZ (US); Rich Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 1183 days.

(21) Appl. No.: 11/266,011

(22) Filed: Nov. 2, 2005

(65) Prior Publication Data
US 2007/0121856 A1 May 31, 2007

(51) Int. Cl.
*H04M 17/00* (2006.01)
(52) U.S. Cl. .......... 379/142.14; 379/211.04; 379/93.05; 370/352; 709/228
(58) Field of Classification Search ............ 379/211.02–211.04; 370/352
See application file for complete search history.

(56) References Cited

U.S. PATENT DOCUMENTS

| | | |
|---|---|---|
| 4,837,798 A | 6/1989 | Cohen et al. |
| 5,410,691 A | 4/1995 | Taylor |
| 5,479,411 A | 12/1995 | Klein |
| 5,524,137 A | 6/1996 | Rhee |
| 5,633,484 A | 5/1997 | Zancho et al. |
| 5,689,550 A | 11/1997 | Garson et al. |
| 5,724,410 A | 3/1998 | Parvulescu et al. |
| 5,742,905 A | 4/1998 | Pepe et al. |
| 5,920,835 A | 7/1999 | Huzenlaub et al. |
| 5,974,449 A | 10/1999 | Chang et al. |
| 6,014,429 A | 1/2000 | Laporta et al. |
| 6,081,830 A | 6/2000 | Schindler |
| 6,094,681 A | 7/2000 | Shaffer et al. |
| 6,154,772 A | 11/2000 | Dunn et al. |
| 6,173,259 B1 | 1/2001 | Bijl et al. |
| 6,353,827 B1 | 3/2002 | Davies et al. |
| 6,366,651 B1 | 4/2002 | Griffith et al. |
| 6,385,611 B1 | 5/2002 | Cardona |
| 6,421,733 B1 | 7/2002 | Tso et al. |
| 6,438,221 B1 | 8/2002 | Lee et al. |
| 6,442,606 B1 | 8/2002 | Subbaroyan et al. |

(Continued)

FOREIGN PATENT DOCUMENTS
WO WO 97/23082 6/1997

OTHER PUBLICATIONS

U.S. Appl. No. 11/228,446, filed Sep. 15, 2005, Jordan Alperin.

(Continued)

*Primary Examiner* — Fan Tsang
*Assistant Examiner* — Ibraham Sharifzada
(74) *Attorney, Agent, or Firm* — Swanson & Bratschun, L.L.C.

(57) ABSTRACT

Systems, methods, and machine-readable media are disclosed to provide notification of receipt of a communication across multiple platforms of potential diverse types. Cross-platform message notification can comprise receiving a request to initiate a communication from an initiating end device. The request may identify a single intended recipient device. A plurality of possible recipient devices can be identified for the request to initiate a communication based on user profile information from a user of the initiating end device. The request to initiate a communication can be forwarded to each of the plurality of possible recipient devices at substantially a same time. The initiating end device can be connected to one of the plurality of possible recipient devices based on a response from at least one of the possible recipient devices.

34 Claims, 5 Drawing Sheets

U.S. PATENT DOCUMENTS

| | | | |
|---|---|---|---|
| 6,459,776 B1 | 10/2002 | Aktas et al. |
| 6,463,463 B1 | 10/2002 | Godfrey et al. |
| 6,483,899 B2 | 11/2002 | Agraharam et al. |
| 6,556,217 B1 | 4/2003 | Makipaa et al. |
| 6,564,264 B1 | 5/2003 | Creswell et al. |
| 6,675,261 B2 | 1/2004 | Shandony |
| 6,694,004 B1 | 2/2004 | Knoerle |
| 6,754,904 B1 | 6/2004 | Cooper et al. |
| 6,768,789 B1 | 7/2004 | Wilk |
| 6,775,658 B1 | 8/2004 | Zothner |
| 6,782,253 B1 | 8/2004 | Shteyn et al. |
| 6,799,174 B2 | 9/2004 | Chipman et al. |
| 6,801,793 B1 | 10/2004 | Aarnio et al. |
| 6,816,582 B2 | 11/2004 | Levine et al. |
| 6,826,173 B1 | 11/2004 | Kung et al. |
| 6,826,407 B1 | 11/2004 | Helferich |
| 6,832,259 B2 | 12/2004 | Hymel et al. |
| 6,832,377 B1 | 12/2004 | Havemose |
| 6,879,838 B2 | 4/2005 | Rankin et al. |
| 6,882,709 B1 | 4/2005 | Sherlock et al. |
| 6,938,087 B1 | 8/2005 | Abu-Samaha |
| 6,964,014 B1 | 11/2005 | Parish |
| 6,977,993 B2 | 12/2005 | Starbuck et al. |
| 6,988,128 B1 | 1/2006 | Alexander et al. |
| 7,013,331 B2 | 3/2006 | Das |
| 7,069,301 B2 | 6/2006 | Jerbi et al. |
| 7,069,309 B1 | 6/2006 | Dodrill et al. |
| 7,072,056 B1 | 7/2006 | Greaves et al. |
| 7,076,734 B2 | 7/2006 | Wolff et al. |
| 7,106,473 B2 | 9/2006 | Sekiguchi |
| 7,120,870 B1 | 10/2006 | Nakamura |
| 7,188,073 B1 | 3/2007 | Tam et al. |
| 7,212,543 B1* | 5/2007 | Arwald et al. ............... 370/466 |
| 7,212,614 B1 | 5/2007 | Burg et al. |
| 7,219,163 B2 | 5/2007 | Robinson et al. |
| 7,224,774 B1 | 5/2007 | Brown et al. |
| 7,272,662 B2 | 9/2007 | Chesnais et al. |
| 7,295,752 B1 | 11/2007 | Jain et al. |
| 7,310,329 B2 | 12/2007 | Vieri et al. |
| 7,343,371 B2 | 3/2008 | Ibuki et al. |
| 7,385,875 B2 | 6/2008 | May et al. |
| 7,526,572 B2 | 4/2009 | Omar et al. |
| 7,551,727 B2 | 6/2009 | Howell et al. |
| 7,587,033 B2 | 9/2009 | Crago et al. |
| 7,596,369 B2 | 9/2009 | Alperin et al. |
| 7,688,962 B1* | 3/2010 | Knoerle et al. ......... 379/211.04 |
| 2002/0026457 A1 | 2/2002 | Jensen |
| 2002/0032589 A1 | 3/2002 | Shah |
| 2002/0075519 A1 | 6/2002 | Konsella et al. |
| 2002/0076027 A1 | 6/2002 | Bernnan et al. |
| 2002/0082030 A1 | 6/2002 | Berndt et al. |
| 2002/0087704 A1* | 7/2002 | Chesnais et al. ............. 709/228 |
| 2002/0098831 A1 | 7/2002 | Castell et al. |
| 2002/0102965 A1 | 8/2002 | Mandahl et al. |
| 2002/0120451 A1 | 8/2002 | Kato et al. |
| 2002/0128036 A1 | 9/2002 | Yach et al. |
| 2002/0144273 A1 | 10/2002 | Reto |
| 2002/0156871 A1 | 10/2002 | Munarriz et al. |
| 2002/0170067 A1 | 11/2002 | Norstrom et al. |
| 2002/0174194 A1 | 11/2002 | Mooney et al. |
| 2002/0194150 A1 | 12/2002 | Bates et al. |
| 2003/0014058 A1 | 2/2003 | Ibuki et al. |
| 2003/0088633 A1 | 5/2003 | Chiu et al. |
| 2003/0097262 A1 | 5/2003 | Nelson |
| 2003/0120717 A1 | 6/2003 | Callaway et al. |
| 2003/0147369 A1 | 8/2003 | Singh et al. |
| 2003/0149646 A1 | 8/2003 | Chen et al. |
| 2003/0172139 A1 | 9/2003 | Srinivasan et al. |
| 2003/0172175 A1 | 9/2003 | McCormack et al. |
| 2004/0005471 A1 | 3/2004 | Daigle et al. |
| 2004/0044663 A1 | 3/2004 | Horompoly |
| 2004/0058673 A1 | 3/2004 | Irlam et al. |
| 2004/0075698 A1 | 4/2004 | Gao et al. |
| 2004/0091089 A1* | 5/2004 | Wynn ........................ 379/93.05 |
| 2004/0199665 A1 | 10/2004 | Omar et al. |
| 2004/0236753 A1 | 11/2004 | Porcari et al. |
| 2004/0267531 A1 | 12/2004 | Whynot et al. |
| 2004/0268265 A1 | 12/2004 | Berger |
| 2005/0015311 A1* | 1/2005 | Frantz et al. .................... 705/26 |
| 2005/0015443 A1 | 1/2005 | Levine et al. |
| 2005/0018653 A1* | 1/2005 | Phillips et al. ................ 370/352 |
| 2005/0033806 A1 | 2/2005 | Harvey et al. |
| 2005/0037762 A1 | 2/2005 | Gurbani et al. |
| 2005/0053206 A1 | 3/2005 | Chingon et al. |
| 2005/0075097 A1 | 4/2005 | Lehikoinen et al. |
| 2005/0086282 A1 | 4/2005 | Anderson et al. |
| 2005/0089149 A1 | 4/2005 | Elias |
| 2005/0091327 A1 | 4/2005 | Koch |
| 2005/0101343 A1 | 5/2005 | Hsiao |
| 2005/0201533 A1 | 9/2005 | Emam et al. |
| 2005/0235307 A1 | 10/2005 | Relan et al. |
| 2005/0246666 A1 | 11/2005 | Kalinoski et al. |
| 2005/0262542 A1 | 11/2005 | DeWeese et al. |
| 2006/0017983 A1 | 1/2006 | Syri et al. |
| 2006/0026302 A1 | 2/2006 | Bennett et al. |
| 2006/0095868 A1 | 5/2006 | Sawada et al. |
| 2006/0104293 A1 | 5/2006 | Kopp et al. |
| 2006/0104430 A1* | 5/2006 | Kirkland et al. ......... 379/211.04 |
| 2006/0104431 A1* | 5/2006 | Emery et al. ............. 379/211.04 |
| 2006/0123082 A1 | 6/2006 | Digate et al. |
| 2006/0156251 A1 | 7/2006 | Suhail et al. |
| 2006/0168065 A1 | 7/2006 | Martin |
| 2006/0218575 A1 | 9/2006 | Blair |
| 2006/0250991 A1 | 11/2006 | Jabri et al. |
| 2006/0265397 A1 | 11/2006 | Bryan et al. |
| 2006/0265427 A1 | 11/2006 | Cohen et al. |
| 2007/0016643 A1 | 1/2007 | Boss et al. |
| 2007/0079010 A1 | 4/2007 | Heredia et al. |
| 2007/0097394 A1 | 5/2007 | Zaima et al. |
| 2007/0139513 A1 | 6/2007 | Fang |
| 2007/0174448 A1 | 7/2007 | Ahuja et al. |
| 2007/0198648 A1 | 8/2007 | Allen et al. |
| 2007/0239833 A1 | 10/2007 | Alperin et al. |
| 2007/0239880 A1 | 10/2007 | Alperin et al. |
| 2007/0239895 A1 | 10/2007 | Alperin et al. |
| 2008/0177616 A1 | 7/2008 | Nemirofsky et al. |
| 2011/0167122 A1 | 7/2011 | Groves et al. |

OTHER PUBLICATIONS

U.S. Appl. No. 11/255,089, filed Oct. 19, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
William J. Daley, Townsend and Townsend, "Office Action Response to Office Action dated Oct. 8, 2008 re:U.S. Appl. No. 11/255,089", filed Jan. 7, 2009, Published in: US.
USPTO—"Office Action Responsive re:U.S. Appl. No. 11/255,089 mailed Oct. 8, 2009", , Publisher: USPTO, Published in: US.
WWW.COMCAST.NET/STORAGE, Comcast online storage, Online Storage-Comcast.net, 2005, Internet Website.
WWW.MYDOCSONLINE.COM, my docs online, My Docs Online: File and Data Storage, Transfer, Delivery Since 1999, Nov. 2005, Internet Website.
WWW.IBACKUP.COM, IBackup Flexible storage solutions for the internet age, Nov. 2005, Internet Website.
WWW.XDRIVE.COM, Xdrive Free Trial!, Nov. 2005, Internet Website.
WWW.STREAMLOAD.COM, Streamload Freedom for Your Digital Lifestyle, Streamload—Share Videos and Photos—Online MP3 Storage and Access, Nov. 2005, Internet Website.
Good Technology, Inc., Introducing GoodLink Enterprise Edition 4.5, GoodLink Enterprise Edition 4.5, 2005, Product Brochure.
Good Technology, Inc., "Goodlink Enterprise Edition 4.5", Published in: US, Product Brochure, 4 pages, 2005.

Koontz, Alan "Find in Page Script", Oct. 13, 1969, Dynamic Drive, "http:/www.dynamicdrive.com/dynamicindex.11/findpage.htm", 2 pages.
The Web Design Resource, "Manipulating Font Size and Color", Jun. 27, 1998, The Web Design Resource, 2 pages.
U.S. Appl. No. 11/228,446, Advisory Action dated Jan. 8, 2009, 3 pages.
U.S. Appl. No. 11/228,446, Advisory Action dated Oct. 1, 2009, 3 pages.
U.S. Appl. No. 11/228,446, Final Office Action dated May 18, 2010, 15 pages.
U.S. Appl. No. 11/228,446, Final Office Action dated Jul. 24, 2009, 11 pages.
U.S. Appl. No. 11/228,446, Final Office Action dated Oct. 24, 2008, 6 pages.
U.S. Appl. No. 11/228,446, Office Action dated Jan. 4, 2010, 17 pages.
U.S. Appl. No. 11/228,446, Office Action dated Jun. 3, 2008, 13 pages.
U.S. Appl. No. 11/228,446, Office Action dated Mar. 3, 2009, 12 pages.
U.S. Appl. No. 11/255,089, Final Office Action dated Sep. 24, 2009.
U.S. Appl. No. 11/255,089, Appeal Brief dated Apr. 26, 2010, 17 pages.
U.S. Appl. No. 11/255,089, Advisory Action dated Dec. 15, 2009, 3 pages.
U.S. Appl. No. 11/255,089, Office Action dated Mar. 10, 2009, 17 pages.
U.S. Appl. No. 11/292,801, Office Action dated Mar. 3, 2009, 9 pages.
U.S. Appl. No. 11/293/028, Advisory Action dated Jul. 6, 2009, 19 pages.
U.S. Appl. No. 11/293,028, Advisory Action dated May 23, 2008., 3 pages.
U.S. Appl. No. 11/293,028, Final Office Action dated Apr. 15, 2009, 12 pages.
U.S. Appl. No. 11/293,028, Final Office Action dated Mar. 17, 2008, 11 pages.
U.S. Appl. No. 11/293,028, Office Action dated Aug. 13, 2008, 9 pages.
U.S. Appl. No. 11/293,028, Office Action dated Nov. 14, 2007, 11 pages.
U.S. Appl. No. 11/293,028, Notice of Allowance dated Oct. 30, 2009, 16 pages.
U.S. Appl. No. 11/399,096, Final Office Action dated Jun. 17, 2009, 11 pages.
U.S. Appl. No. 11/399,096, Office Action dated Dec. 7, 2009, 10 pages.
U.S. Appl. No. 11/399,096, Office Action dated Jan. 22, 2009, 14 pages.
U.S. Appl. No. 11/399,096, Final Office Action dated May 24, 2010, 12 pages.
U.S. Appl. No. 11/399,098, Notice of Allowance dated Jun. 2, 2009, 6 pages.
U.S. Appl. No. 11/399,098, Office Action dated Aug. 25, 2008, 13 pages.
U.S. Appl. No. 11/399,098, Terminal Disclaimer dated Nov. 25, 2008, 1 page.
U.S. Appl. No. 11/399,098, Requirement for Election/Restriction dated Feb. 25, 2009, 6 pages.
U.S. Appl. No. 11/399,098, Response to Requirement for Election/Restriction dated Mar. 11, 2009, 10 pages.
U.S. Appl. No. 11/399,098, filed Apr. 5, 2006, now US Patent No. 7,596,369, 16 pages.
U.S. Appl. No. 11/399,585, Office Action dated Mar. 24, 2009, 16 pages.
U.S. Appl. No. 11/399,585, Advisory Action dated Jan. 25, 2010, 3 pages.
U.S. Appl. No. 11/399,585, Final Office Action dated Nov. 4, 2009, 10 pages.
U.S. Appl. No. 11/399,585, Non-Final Office Action dated Sep. 21, 2010, 15 pages.
U.S. Appl. No. 11/400,643, Final Office Action dated Jul. 27, 2009, 18 pages.
U.S. Appl. No. 11/400,643, Office Action dated Jan. 9, 2009, 17 pages.
U.S. Appl. No. 11/400,643, Advisory Action dated Jan. 19, 2009, 3 pages.
U.S. Appl. No. 11/400,644, Office Action dated Jan. 21, 2009, 16 pages.
U.S. Appl. No. 11/400,616, Final Office Action dated Feb. 1, 2010, 16 pages.
U.S. Appl. No. 11/400,616, Office Action dated Jul. 13, 2009, 21 pages.
U.S. Appl. No. 11/399,097, Final Office Action dated Sep. 1, 2010, 10 pages.
U.S. Appl. No. 11/399,097, Office Action dated Mar. 26, 2010, 12 pages.
U.S. Appl. No. 11/399,097, Requirement for Election/Restriction dated Jan. 26, 2010, 6 pages.
U.S. Appl. No. 11/399,097, Response to Requirement for Election/Restriction dated Feb. 22, 2010, 1 page.
U.S. Appl. No. 11/399,584, Examiner's Answer to Appeal Brief dated Jun. 22, 2009, 16 pages.
U.S. Appl. No. 11/399,584, Appeal Brief dated Mar. 12, 2009, 24 pages.
U.S. Appl. No. 11/399,584, Advisory Action dated Dec. 18, 2008, 3 pages.
U.S. Appl. No. 11/399,584, Final Office Action dated Sep. 12, 2008, 12 pages.
U.S. Appl. No. 11/399,584, Office Action dated Mar. 6, 2008, 10 pages.
U.S. Appl. No. 11/383,620, Office Action dated Nov. 9, 2010, 17 pages.
U.S. Appl. No. 11/383,620, Final Office Action dated May 14, 2010, 20 pages.
U.S. Appl. No. 11/383,620, Office Action dated Nov. 9, 2009, 15 pages.
U.S. Appl. No. 11/383,620, Office Action dated Apr. 2, 2009, pages.
U.S. Appl. No. 11/399,096, Office Action dated Oct. 27, 2010, 11 pages.
U.S. Appl. No. 11/228,446, Final Office Action dated Jun. 21, 2011, 35 pages.
Googlebar, "Googlebar Release," Mar. 17, 2005, http://googlebar.mozdev.org/releases.html, all pages including Bug 8938 details; 7 pages.
Surtell, "Google highlighting," Jan. 27, 2004, http://surtell.com/projects_code_google_hightlighting.asp, 7 pages.
U.S. Appl. No. 11/400,643, Pre-Appeal Brief and Notice of Appeal dated Jun. 7, 2011, 6 pages.
U.S. Appl. No. 11/399,096, Notice of Panel Decision from Pre-Appeal Brief Review dated May 20, 2011, 2 pages.
U.S. Appl. No. 11/383,620, Final Office Action dated Mar. 28, 2011, 27 pages.
U.S. Appl. No. 11/400,616, Office Action dated Mar. 16, 2011, 16 pages.
U.S. Appl. No. 11/400,643, Office Action dated Mar. 7, 2011, 21 pages.
U.S. Appl. No. 11/400,643, Office Action dated Oct. 14, 2010, 19 pages.
U.S. Appl. No. 11/399,097, Office Action dated Jan. 11, 2011, 11 pages.
Ashok Hariharan, "DHTML TeIDS 3/22/11t Marker—An EIDS 3/22/11periment," Jul. 2002, evolt.org, http://evolt.org/node/29028, 8 pages.
Vic Phillips, web site "http://homepgae.ntlworld.com/vwphillips/SearchForTeIDS 3/22/11t.htm" titled "JavaScript Code for Search for TeIDS 3/22/11r", Jan. 15, 2005, 5 pages.
Chris McC, "Determining if span/div is visible or not," Jun. 2004, JavaScript and AJAIDS Mar. 22, 2011 Forum, http://www.webmasterworld.com/forum91/1935.htm, 4 pages.
Brian Suda et al., "Enhance Usability by Highlighting Search Terms," A List Apart, http://www.alistapart.com/articles/searchhighlight, 4 pages.

Alan Koontz, "Find in Page Script", Jun. 2003, Dynamic Drive, http://www.dynamicdrive.com/dynamicindelDS 3/22/1111/findpage.htm, 7 pages.

U.S. Appl. No. 11/228,446, Office Action dated Feb. 22, 2011, 20 pages.

U.S. Appl. No. 11/399,096, Final Office Action dated Feb. 11, 2011, 15 pages.

U.S. Appl. No. 11/399,585, Final Office Action dated Feb. 8, 2011, 23 pages.

U.S. Appl. No. 11/400,616; Non Final Office Action dated Aug. 18, 2011; 35 pages.

U.S. Appl. No. 11/400,643; Non Final Office Action dated Jul. 28, 2011; 20 pages.

U.S. Appl. No. 11/399,097; Notice of Allowance dated Jul. 29, 2011; 20 pages.

U.S. Appl. No. 11/399,097; Notice of Allowance dated Aug. 23, 2011; 5 pages.

U.S. Appl. No. 11/399,096, Office Action dated Jul. 12, 2011; 14 pages.

U.S. Appl. No. 11/399,585, Office Action dated Jul. 18, 2011; 20 pages.

U.S. Appl. No. 11/400,643; Notice of Panel Decision dated Jul. 11, 2011; 2 pages.

U.S. Appl. No. 11/383,620; Non Final Office Action dated Aug. 31, 2011; 21 pages.

U.S. Appl. No. 11/399,097; Supplemental Notice of Allowability dated Oct. 20, 2011; 5 pages.

U.S. Appl. No. 11/399,097; Supplemental Notice of Allowance dated Aug. 23, 2011; 5 pages.

U.S. Appl. No. 11/399,097; Supplemental Notice of Allow ance dated Oct. 20, 2011. 5 pages.

U.S. Appl. No. 11/399,096; Non Final Office Action dated Jul. 12, 2011; 14 pages.

U.S. Appl. No. 11/399,585, Non Final Office Action dated Jul. 18, 2011; 20 pages.

U.S. Appl. No. 11/383,620, Non Final Office Action dated Aug. 31, 2011; 21 pages.

* cited by examiner

CROSS-PLATFORM MESSAGE NOTIFICATION

CROSS REFERENCE TO RELATED APPLICATIONS

This application is related to co-pending U.S. patent application Ser. No. 11/255,089 entitled "Cross-Platform Support for a Variety of Media Types" filed Oct. 19, 2005, that is herein incorporated by reference in its entirety.

BACKGROUND OF THE INVENTION

Embodiments of the present invention relate generally to communications networks and more particularly to supporting multiple message notifications across various platforms or devices.

Today it is very common, and probably the norm, for an individual to have and regularly use a number of communications devices of different types that communicate via a variety of different media. For example, an individual may, on a daily basis, use a number of different telephones such as a work line a home line, one or more cell phones, etc. Additionally, this same individual may have and use a number of other communications devices and/or media such as one or more email accounts, one or more instant message accounts, etc. that are accessible through any of a number of different devices such as personal computers various portable devices, and/or other network attached devices that communicate via the Internet or other network.

While the availability of these devices helps people stay in touch and communicate, it can present problems. For one, an individual using a number of communication devices may not be in constant or even regular use of one or more of these devices. For example, an individual may not carry his cell phone or Personal Digital Assistant (PDA) with him when he is in his office. Therefore, messages to these devices may go unnoticed by the user for an extended period of time. This leaves a caller or originator of the message to wait for the recipient of the message to notice and return the message. In other cases, an originator of a message may try other devices, such as the individuals work phone number, cell phone number, home number, different email or instant message addresses, etc. However, this leaves the originator with a number of different numbers and or addresses to try. This is burdensome and perhaps annoying to the originator. Further, the originator may know only one number or address associated with a particular individual and may be unaware of the individuals other numbers and/or addresses.

Currently, there is no way for a caller or originator of a message to place a single call or send a single message to one of a recipients devices that will notify the recipients other devices of the message. That is, an originator cannot place a call or send an email message to one of a recipients devices that causes all of the recipient's other devices, some or all of which the originator may be unaware of, to ring or give some indication of the message. Hence, there is a need for methods and systems that allow for cross-platform message notification.

BRIEF SUMMARY OF THE INVENTION

Systems, methods, and machine-readable media are disclosed to provide notification of receipt of a communication across multiple platforms of potentially diverse types. In one embodiment, a method of cross-platform message notification can comprise receiving a request to initiate a communication from an initiating end device. The request may identify a single intended recipient device. A plurality of possible recipient devices can be identified for the request to initiate a communication based on user profile information from a user of the initiating end device. The request to initiate a communication can be forwarded to each of the plurality of possible recipient devices at substantially the same time. The initiating end device can be connected to one of the plurality of possible recipient devices based on a response from at least one of the possible recipient devices.

According to one embodiment, the plurality of possible recipient end devices can include the intended recipient device. According to another embodiment, receiving a request to initiate a communication can comprise receiving a phone call to a single phone number or receiving a message to a single address. The message can comprise an email message or an Instant Message (IM).

According to another embodiment, the method can also include determining from the user profile information from the user of the initiating end device whether cross-platform message notification is enabled prior to determining a plurality of possible recipient devices. In some cases, determining a plurality of possible recipient devices can comprise determining an identifier for each of the plurality of possible recipient devices stored in the user profile information from the user of the initiating end device and associated with the intended recipient device. The identifier can comprise a phone number, an email address, or an Internet Protocol (IP) address, or other identifier.

According to yet another embodiment, a system can comprise a communications bus and a user profile database communicatively coupled with the communications bus. The user profile database can be adapted to maintain user profile information for a plurality of users. The system can also include a plurality of end devices of different types, each end device communicatively coupled with the communications bus. The end devices can be adapted to send and receive common language messages via the communications bus, to translate common language messages received from the communications bus to a format specific to the end device based on the type, and to store user profile information in the user profile database. One or more managers can also be communicatively coupled with the communications bus. Each manager can be adapted to receive via the communications bus a request to initiate a communication from an initiating end device of the plurality of end devices. The request can identify a single intended recipient device of the plurality of end devices. The manager can be adapted to determine a plurality of possible recipient devices for the request to initiate a communication from the plurality of end devices based on user profile information stored in the user profile database by a user of the intended recipient device. The manager can then forward the request to initiate a communication to each of the plurality of possible recipient devices at substantially a same time and connect the initiating end device to one of the plurality of possible recipient devices based on a response from at least one of the possible recipient devices.

According to still another embodiment, a machine-readable medium can have stored thereon a series of instruction which, when executed by a processor, cause the processor to perform cross-platform message notification. Cross-platform message notification can comprise receiving a request to initiate a communication from an initiating end device. The request may identify a single intended recipient device. A plurality of possible recipient devices can be identified for the request to initiate a communication based on user profile information from a user of the initiating end device. The request to initiate a communication can be forwarded to each of the plurality of possible recipient devices at substantially the same time. The initiating end device can be connected to one of the plurality of possible recipient devices based on a response from at least one of the possible recipient devices.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing notification of receipt of a communication across multiple platforms of potentially diverse types. As will be described in detail below, cross-platform message notification can comprise receiving a request to initiate a communication from an initiating end device. The request may identify a single intended recipient device. A plurality of possible recipient devices can be identified for the request to initiate a communication based on user profile information from a user of the initiating end device or the intended recipient device. The request to initiate a communication can be forwarded to each of the plurality of possible recipient devices at substantially the same time. The initiating end device can be connected to one of the plurality of possible recipient devices based on a response from at least one of the possible recipient devices.

So, in effect, the user of the initiating end device, such as a cell phone, can initiate a communication, such as placing a phone call, with the user of a recipient device, such as another cell phone or other telephone. As a result of the initiation of this communication, a number of other devices associated with the recipient can be made to inform the recipient of the communication. That is, the recipient's Personal Digital Assistant (PDA), Personal Computer (PC), and/or other telephones can ring or otherwise inform the user of the communication. The devices of the recipient to ring or give notice of the communication can be based on a set of user profile information provided by either the user of the initiating end device or the user of the recipient end device and stored in a user profile database.

Figure 1:
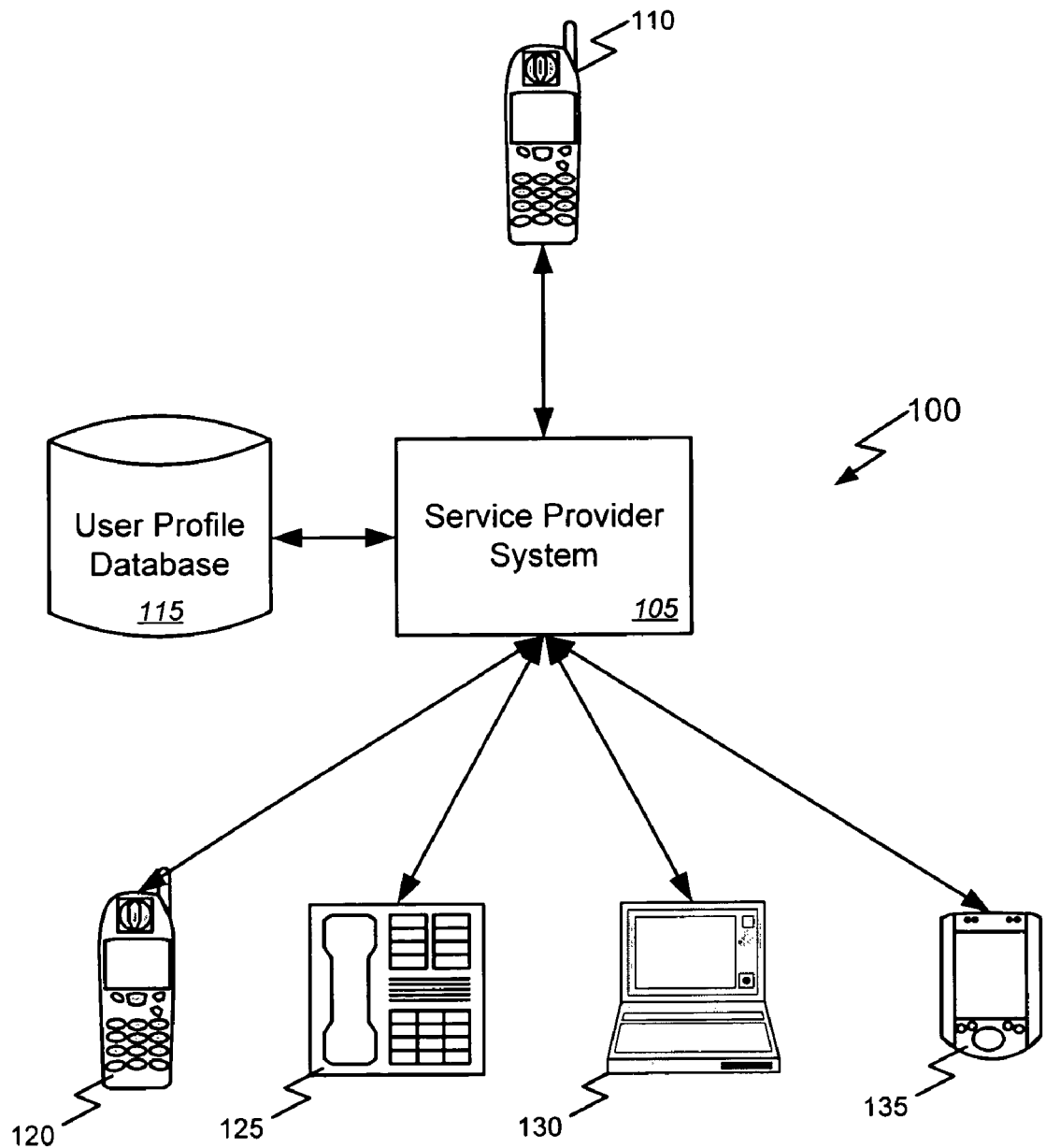
FIG. 1 is a block diagram illustrating, at a high-level, functional components of an architecture for providing cross-platform message notification according to one embodiment of the present invention.

FIG. 1 is a block diagram illustrating, at a high-level, functional components of an architecture for providing cross-platform message notification according to one embodiment of the present invention. In this example, the system 100 includes an initiating device 110 communicatively coupled with a service provider system 105. The service provider system 105 is communicatively coupled with a user profile database 115 and a plurality of recipient devices 120-135. Generally speaking, and as will be described in greater detail below, the initiating device 110 can initiate a communication such as a telephone call to one of the recipient devices 120-135 through the service provider system 105. Based on information stored in the user profile database 115, the service provider system 105 can notify a plurality of the recipient devices 120-135 of the communication at substantially the same time and connect the initiating device to one of the recipient devices 120-135 based on a response that device.

Initiating device 110 can be any of a number of possible communication devices. While illustrated here as resembling a cell phone, initiating device can also be a land line telephone, a Personal Digital Assistant (PDA), any of a variety of wireless devices, a personal computer, etc. Regardless of the exact type of device, initiating device 110 can be communicatively coupled with service provider system 105 via typical communication media such as a cellular network, a land line telephone, a Local Area Network (LAN), Wide Area Network (WAN), the Internet, or other type of network. Through this communication media, initiating device 110 can send and receive communications to and from the service provider system 105.

Service provider system 105 can be one or more systems adapted to provide communications services of one or more types to the initiating device 110. For example, service provider system 105 can be a system providing cellular telephone services, land line telephone services, Internet services, etc. Service provider system 105 can be adapted to send and receive communications of an appropriate type to and from initiating device 110.

User profile database 115 can be communicatively coupled with service provider system 105 via a Local Area Network (LAN), Wide Area Network (WAN), the Internet, or other type of network or other communications media. While user profile database 115 is shown in this example as being separate from the service provider system 105, the user profile database may be internal or external to the service provider system 105 or may be part of and/or maintained by another system and may be either local to or remote from the service provider system 105. Regardless of the exact configuration, user profile database 115 maintains a set of user profile data or preferences for one or more users of the service provider system 105 such as a user of initiating device 110 and/or users of recipient devices 120-135. For example, the user profile database 115 may include information relating to call features such as call forwarding or other information relating to other types of communications such as email delivery options.

As will be seen, user profile database 115 can also store information related to message notification features. More specifically, user profile database 115 can include a list of phone numbers, device addresses, or other identifying information for one or more recipient devices that a user of an initiating device may wish to contact. In other words, the user profile database 115 can include an identifier, such as a phone number, email address, Internet Protocol (IP) address, instant message address, physical address, MAC address, etc for each of the plurality of possible recipient devices. When the user of the initiating device 110 initiates a communication to one of these devices, the service provider system 105 can look up other related devices and generate a message, communication, notification, etc. appropriate to each of those devices to inform the recipient of the requested communication. In this way, all of the identified devices can "ring" or otherwise inform the user of a message or call at approximately the same time.

Recipient devices 120-135 can be any of a number of possible communication devices. For example, recipient devices can be cell phones, land line telephones, Personal Digital Assistants (PDAs), any of a variety of wireless devices, Personal Computers (PCs), etc. Regardless of the exact types of devices, recipient devices 120-135 can be communicatively coupled with service provider system 105 via typical communication media such as a cellular network, a land line telephone, a Local Area Network (LAN), Wide Area Network (WAN), the Internet, and/or other types of networks. Through this communication media recipient devices 120-135 can send and receive communications to and from the service provider system 105.

Importantly, while referred to herein as a recipient device or an initiating device for the sake of explanation, any device coupled with the service provider system 105 can potentially, at various times, act as either an initiating device or a recipient device. For example, a particular cell phone may at one point initiate a call but at another time may receive a call. Therefore, the labels of initiating device and recipient device are illustrative only and indicate only a particular device's function at a specific point in time rather than indicating any limits on its functionality overall.

In use, initiating device 110 can initiate a communication, such as a phone call, email, instant message, etc. According to one embodiment of the present invention, this can be accomplished by the initiating device 110 sending a request to the service provider system 105. The request can identify a single intended recipient device. That is, the initiating device 110 can place a call to a particular phone number or send a message to a particular email or Internet Protocol (IP) address or otherwise direct a communication to a particular recipient device.

The service provider system 105 can then receive the request to initiate a communication from the initiating end device 110 and determine a plurality of possible recipient devices for the request. This determination can be based on the user profile information in the user profile database previously provided by the user of the initiating end device or the user of the intended recipient device, i.e., the device called or otherwise addressed by the initiating device 110. In other words, when the user of initiating device 110 has decided to call his friend Chuck and places a call to a particular number associated with Chuck, such as his cell phone number, the service provider system 105 can receive this request or call, lookup other information, i.e., numbers or addresses, related to Chuck stored in the user profile database 115, and use these numbers and/or addresses and information identifying the type of device at that number or address to generate a message of communication appropriate to that device and forward the call to all, or some subset of all, of Chuck's devices at approximately the same time.

The service provider system 105 can then forward the request to initiate a communication to each of the plurality of possible recipient devices and connect the initiating end device to one of the plurality of possible recipient devices based on a response from at least one of the possible recipient devices. That is, the service provider system can connect the initiating device 110 to a recipient devices based on, for example, that device being the first to answer, i.e., acknowledge the request.

Therefore, the user of the initiating device can call or send a message to a single number or address. The service provider system then generates messages or communications appropriate for other recipient devices associated with the original number or address and forwards this call or message to the other devices. So, a single call, e.g., to Chuck's cell phone, can cause the call or message to be forwarded to multiple devices, e.g., Chuck, home phone, work phone, PDA, personal computer, pager, etc., as well as the originally called number at substantially the same time. If Chuck picks up one of these phones or devices, e.g., his work phone, the initiating device can be connected to that particular device. In the case of other types of communications or devices, such as an email or instant message, connecting the initiating device to the recipient device(s) can comprise simply delivering the message to that device or giving some other indication to the recipient that a communication or message is being delivered or attempted. For example, a pop-up or other indication can be made to appear on Chuck's PC informing him that his work phone is ringing, or an email can be generated indicating an attempted call from the initiator to Chuck's cell phone at a particular time and delivered to Chuck's email address(es) as indicated in the user profile database.

Alternatively, another architecture that provides support for communications between a number of different devices of different types may be used to provide the same functions. Such an architecture is described in the above referenced, co-pending U.S. Patent Application titled "Cross Platform Support for a Variety of Media Types." While not necessary to implement various embodiments of the present invention, such an architecture is considered useful with embodiments of the present invention since it provides a communication bus that in turn provides a common representation, in the form of a number of common language messages, of services or information available to, from, and between end devices regardless of the type of end device or the server providing or receiving the information or service. Furthermore, the architecture includes a central user profile database that can be used to store information related to related to message notification features such as discussed above. An overview of this architecture is now provided for convenience.

Figure 2:
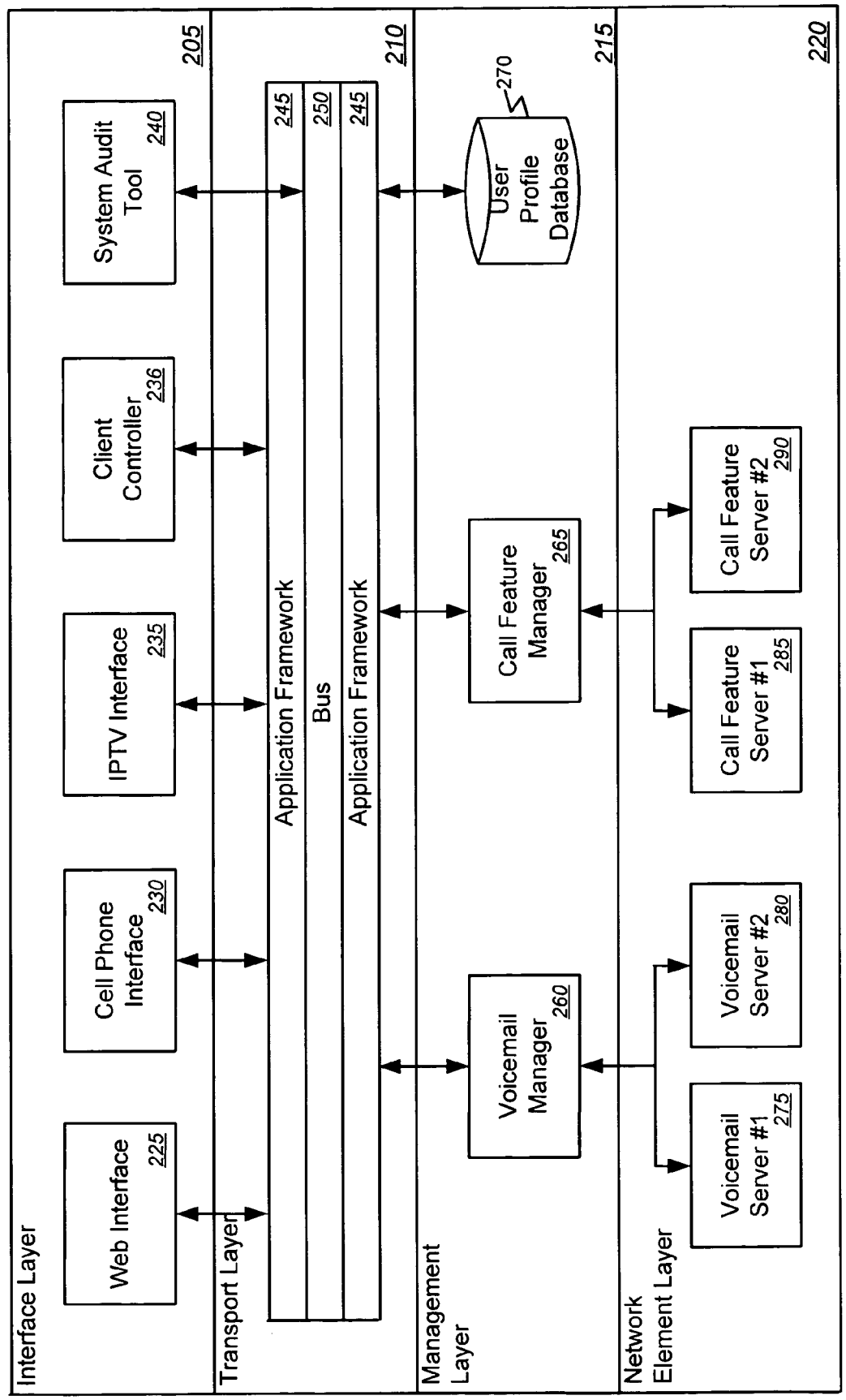
FIG. 2 is a block diagram illustrating functional component of an architecture for providing cross-platform message notification according to an alternative embodiment of the present invention.

FIG. 2 is a block diagram illustrating functional component of an architecture for providing cross-platform message notification according to an alternative embodiment of the present invention. In this example, the architecture is logically divided into four layers 205-220. The layers 205-220 include a network element layer 220, a management layer 215, a transport layer 210, and an interface layer 205. As will be seen, elements of each layer 205-220 can be communicatively coupled with elements of the next layer 205-220. So, elements of the network element layer 220 can be communicatively coupled with elements of the management layer 215 which in turn can be communicatively coupled with elements of the transport layer 210, etc.

The network element layer 220 can comprise one or more servers 275-290. The servers 275-290 of the network element layer 220 can each provide content and/or services of one or more types. For example, one or more servers 275 and 280 may provide voicemail services while one or more other servers 285 and 290 provide one or more call features such as call forwarding, caller ID, etc. Importantly, while this example shows a limited number of servers 275-290 in the network element layer 220, many more servers, providing a wide range of content or services of various types may be included. For example, one or more servers may be included for providing Internet services, Internet Protocol Television (IPTV) services, Email services, and various other types of data, communication, and/or entertainment services.

The management layer 215 can comprise one or more managers 260 and 265. Each manager 260 and 265 can be communicatively coupled with one or more of the servers 275-290 of the network element layer 220. For example, voicemail manager can be coupled with voicemail servers 275 and 280 while call feature manager 265 can be coupled with call feature servers 285 and 290. Importantly, while managers 260 and 265 and servers 275-290 are shown and described herein as being organized by or arranged per service, other arrangements are contemplated and considered to be within the scope of the present invention. According to one alternative, the managers 260 and 265 and the servers 275-290 may be arranged by company or provider. So, for example, one manager may be coupled with and provide access to the services and content provided by the servers of company A while another manager may be coupled with and provide access to the services and content provided by the servers of company B. However, an arrangement of managers 260 and 265 and servers 275-290 based on service and/or content type may be preferable since, as will be seen, such an arrangement can provide for easier extensibility of the system when adding features or services.

Furthermore, as noted above, additional servers may be used in the network element layer providing additional services and/or content of different types. Therefore, more, fewer, or different managers than shown in this example may be used in an actual implementation. For example an additional manager may be used for interfacing with one or more servers providing IPTV services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

Regardless of the exact number, nature, or organization of the servers 275-290 and managers 260 and 265, the managers 260 and 265 can be adapted to translate content of the servers 275-290 with which the manager 260 and 265 is connected from the media types of the servers 275-290 to one or more common language messages. That is, the managers 260 and 265 can provide translation from a service specific format to a common or generic format. For example, voicemail server #1 275 and voicemail server #2 280 may be operated by different entities and offer different information in different formats that may be completely incompatible with each other. However, voicemail manager 260 provides for translating these different functions, formats, etc into a common language message that can be used by all other elements of the architecture.

According to one embodiment of the present invention, the managers 260 and 265 can provide defined interfaces to the servers 275-290 of the network element layer 220. By using calls, invocations, requests, or other signals or messages to the managers 260 and 265, the servers 275-290 can pass content or messages to the managers 260 and 265 for translation to a common language message for transmission to another element of the architecture. For example, voicemail manager 260 may provide an Application Program Interface (API) for use by any voicemail server 275 and 280 connected with the voicemail manager 260. Voicemail servers 275 and 280 can then use API calls to the voicemail manager 260 to initiate services, pass content or other information, and/or otherwise communicate with the voicemail server 260.

According to one embodiment of the present invention, calls to the API or other interface may be closely analogous to the common language messages generated by the manager. For example, as will be described in detail below, the manager may generate "Make-a-Call" message to initiate a communication. The manager's API may also provide a "Make-a-Call" or other similar call to the servers to which it is connected through which the servers can initiate a communication.

While use of an API or other defined interface between the managers 260 and 265 and the servers 275-290 is not required, it may be preferred since, by using an API or other type of defined interface, the managers 260 and 265 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as a "Make-a-Call" object, with properties representing, among other possibilities, the content of data to be communicated, the intended recipient(s), etc. Such an object or common language message may be defined in a common format readable by other elements of the architecture. For example, the object may be defined in an eXtensible Markup Language (XML) file. The manager can then transmit this object or common language message to any or all of the other elements of the architecture via the transport layer 210.

The transport layer 210 can comprise a communications bus 250 communicatively coupled with each of the managers 260 and 265. The bus 250 can be adapted to receive and transport the one or more common language messages from the managers 260 and 265. The transport layer 210 can also comprise an optional application framework 245 interposed between the end devices 225-236 of the interface layer 205 and the communications bus 250 and between the managers 260 and 265 and the communications bus 250. Generally speaking, the application framework 245 provides for monitoring and tracking of the common language messages placed on the bus 250 of the transport layer 210.

Regardless of whether the application framework 245 is used, the bus 250 of the transport layer 210 comprises a common representation of data that is usable by all elements of the architecture. Furthermore, the bus 250 provides this message to any or all devices in the architecture as appropriate regardless of the type of device.

According to one embodiment of the present invention, the bus 250 may also be implemented using object-oriented programming techniques. In such a case, a manager placing or sending a common language message on the bus 250 can call or invoke an API or other interface of the bus 250 or otherwise cause the instantiation of an object of a particular class type, such as a "Make-a-Call" object, with properties representing, among other possibilities, the content of data to be communicated, the intended recipient(s), etc. The bus can then make this object or common language message available to any or all of the other elements of the architecture.

The interface layer 205 of the architecture can comprise one or more end devices 225-236 of different types. For example, the end devices 225-236 can represent a cell phone

230, a web browser 225, a IPTV interface 235, etc all potentially operating on different platforms with different operating systems. Each end device 225-236 can be communicatively coupled with the bus 250 of the transport layer, either directly or via the application framework 245, and can be adapted to receive and translate the common language messages to a format specific to the end device based on its type.

Alternatively or additionally, one or more of the end devices may comprise a client controller 236 communicatively coupled with the bus 250 of the transport layer 210 and one or more other end devices (not shown here) such as a personal computer, television Set-Top Box (STB), telephone, or other type of device. If used, the client controller 236 can be adapted to receive common language messages from the bus 250, translate content from the common language messages to a format specific to the end device(s) for which it is intended, and deliver the device specific message to the device or devices. In some cases, the client controller 236 may also be adapted to act as a firewall for end devices communicating via the bus 250 of the transport layer 210.

That is, the end devices 225-236 can translate from the common language messages, such as an XML message, to device specific representations of the information in that message for presentation to user in whatever format that device uses. According to one embodiment, the translation functions of the end devices can also be implemented using object-oriented programming techniques. In such a case, the end devices receive the common language messages such as XML encoded representations of the objects on the bus 250 of the transport layer 210. Translation can therefore comprise instantiating on the end device an object of the class indicated by the message with the properties indicated by the message thereby translating the properties of the object on the bus to a presentation language of the device.

Thus far, the description of the architecture has focused on messages from the servers 275-290 to the end devices 225-236. However, the end devices 225-236 can also be adapted to generate one or more common language messages based on user input and send the one or more common language messages to one or more of the managers 260-265 via the bus 250. For example, a cell phone 230 or other end device 225-236 can generate a "Make-a-call" message to be sent to any or all of the managers 260-265 or even to another end device. Therefore, the managers 260-265 can be further adapted to receive the common language messages from the end devices 225-236 via the bus 250 and to translate the common language messages to content of the media type of the servers 275-290 with which the manager 260 and 265 is connected.

According to one embodiment of the present invention, the architecture can include a user profile database 270 communicatively coupled with the bus 250 of the transport layer. The user profile database 270 can be adapted to maintain records of a set of user preferences for one or more of the end devices 225-236 of the interface layer 205. For example, IPTV or cell phone settings or options for a particular device and/or a particular user can be stored in the user profile database 270 for retrieval by one or more of the end devices 225-236 or one or more of the managers 260 and 265. Therefore, he user profile database 270 can be adapted to provide the preferences to one or more of the end devices 225-236 or one or more of the managers 260 and 265 in response to a common language message received via the bus 250. In another example, the user profile database 270 can be adapted to store information related to message notification features. More specifically, user profile database 270 can include a list of phone numbers, device addresses, or other identifying information for one or more recipient devices that a user of an initiating device may wish to contact. In other words, the user profile database 270 can include an identifier, such as a phone number, email address, Internet Protocol (IP) address, etc for each of the plurality of possible recipient devices. When the user of the initiating device initiates a communication to one of these devices, the manager 260 and 265 and/or server 275-290 providing the service associated with the recipient device can look up other related devices to inform the recipient of the requested communication. In this way, all of the identified devices can "ring" or otherwise inform the user of a message or call.

According to another embodiment of the present invention, the architecture can further comprise a system audit tool 240 communicatively coupled with the bus 250 of the transport layer 210. The system audit tool 240 can be adapted to monitor common language messages on the bus 250.

Therefore, in use, the bus 250 provides a common representation of services or information available to, from, and between the end devices 225-236 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include a "Make-a-Call" request message indicating a request to initiate a communication. Similarly, the common language messages can include a "Make-a-Call" response message acknowledging initiation of a communication. According to another embodiment, the common language messages can include a "Call Information" request indicating a request for information relating to a communication and a "Call Information" response providing requested information. The common language messages can also include a "Call Event Notification" message indicating the occurrence of a communication.

In some cases, the common language messages can include an "Update Profile" message indicating a change to one or more user defined preferences. As indicated above, such a message can be useful in updating one or more entries in the user profile database 170. Furthermore, such a message may be useful in informing other devices of a change.

According to one embodiment of the present invention, the common language messages can also include a periodic "Heartbeat" message indicating a normal status of an end device, manager, and/or server. Since the architecture is loosely coupled, i.e., any given device or service is not directly coupled with any other, elements of the architecture may not be aware of the availability of another. So, each element of device can periodically send a heartbeat message. As will be discussed below, this message may be monitored by the system audit tool for maintenance and/or troubleshooting purposes.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an MP3 or MP4 audio or video file, a hyperlink or other direction to a location of the actual content, etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as a "Make-a-Call" object, with properties representing, among other possibilities, the content of data to be communicated, the intended recipient(s), etc.

According to one embodiment, the common language messages can include a "Make-a-Call" request message indicating a request to initiate a communication. Such a message can be initiated by one of the end devices 225-240 and sent via the bus 250 of the transport layer 210 to a manager 260 or 265 coupled with a server 275-290 providing a service to that end device. Upon receiving the message, the server or manager can look up other devices related to the called device in the user profile database 270. The server can then generate "Make a Call" request messages to the other devices to inform the recipient of the requested communication. In this way, all of the identified devices can "ring" or otherwise inform the user of a message or call at substantially the same time. In some cases, for example, depending upon the type of device to which the message is being sent, the message can include some content. For example, if a notice is being sent to an email address or IPTV interface that a phone call is being received, the manager or server may generate a brief textual or other message indicating that a call is being received at a particular number from a particular caller and insert this text into the body of the message. In other cases, such as a phone call to other telephone(s), the message may simply comprise the message header which, when received by a potential recipient device, causes the device to ring or give some other indication. When the user of the devices answers or acknowledges one of these requests, the end device can generate and send a "Make a Call" response back to the server which in turn can connect the initiating device with this recipient device for further communication.

Figure 3:
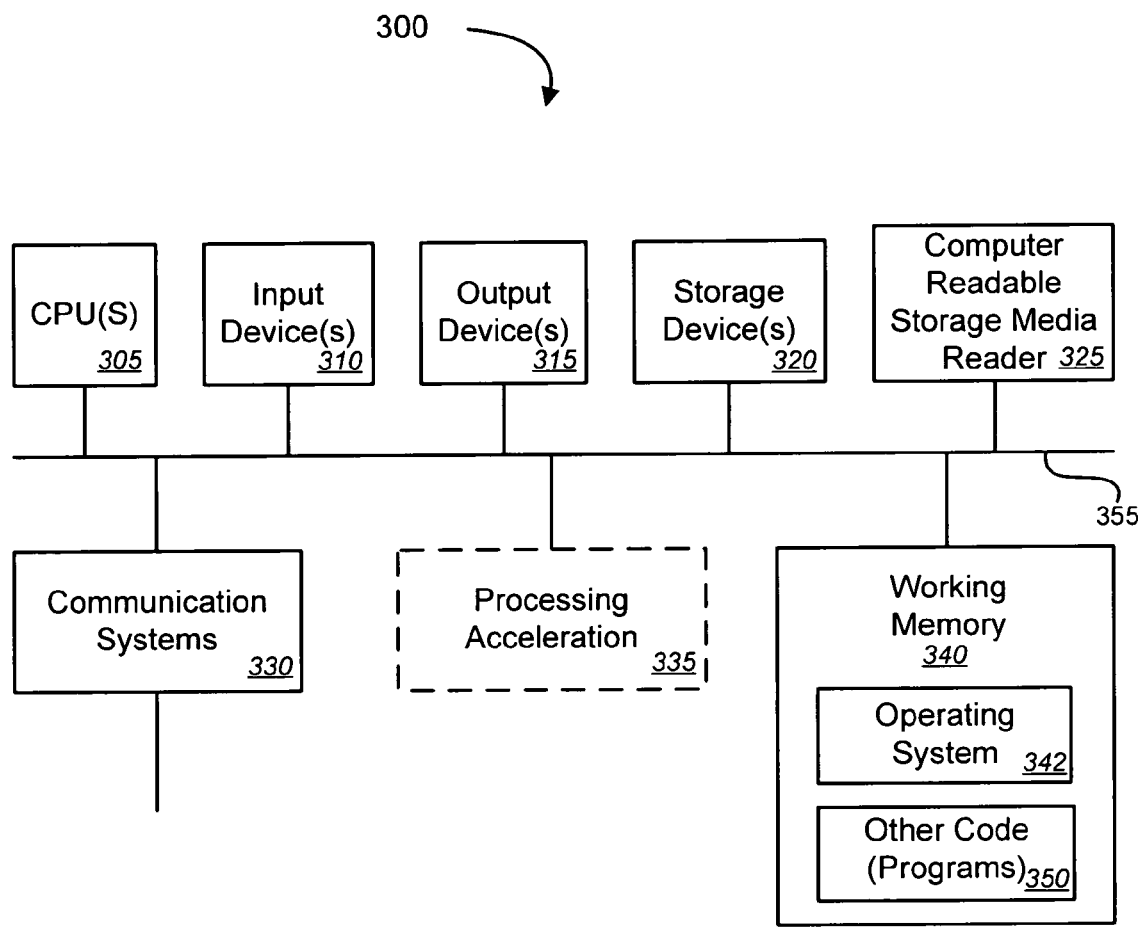
FIG. 3 is a block diagram illustrating an exemplary computer system in which embodiments of the present invention may be implemented.

FIG. 3 is a block diagram illustrating an exemplary computer system in which embodiments of the present invention may be implemented. This example illustrates a computer system 300 such as may be used, in whole, in part, or with various modifications, to provide various components of the systems discussed above.

The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 320 and/or any other computer described above with respect to the system 300.

The computer system 300 may also comprise software elements, shown as being currently located within a working memory 340, including an operating system 445 and/or other code 350. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code for code 350 for implementing any or all of the function of the various elements of the architecture as described herein. For example, software, stored on and/or executed by a computer system such as system 300, can provide the functions of the service provider system, a manager, an end device, etc. Methods implemented by software on some of these components will be discussed in detail below.

Figure 4:
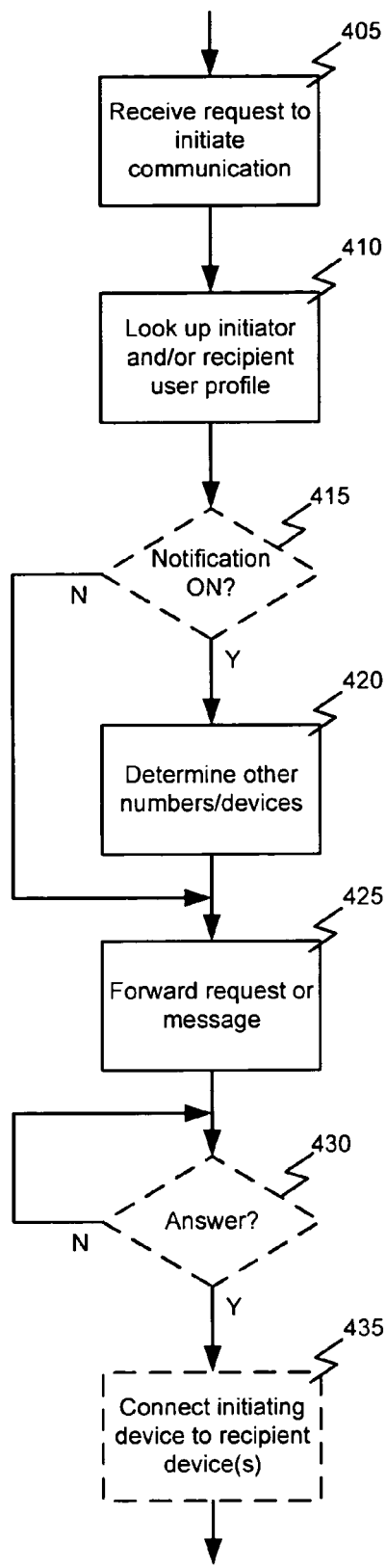
FIG. 4 is a flowchart illustrating a process for cross-platform message notification according to one embodiment of the present invention.

FIG. 4 is a flowchart illustrating a process for cross-platform message notification according to one embodiment of the present invention. This example represents a process that may be performed by the service provider system discussed above with reference to FIG. 1, one or more of the servers or managers of the network element layer discussed above with reference to FIG. 2, or another system or device depending upon the environment in which the methods are implemented.

In this example, the implementing system can receive 405 a request to initiate a communication from an initiating end device. The request can identify a single intended recipient device. Receiving a request to initiate a communication can comprises receiving a phone call to a single phone number, receiving a message to a single address such as an email message or an Instant Message (IM), etc. Based on this request, the system can lookup or read user profile information for the initiator and/or the recipient. That is, the cross-platform message notification can be based on either the initiator's preference information, the recipient's preference information, or some combination thereof.

Optionally, a determination 415 can be made as to whether cross-platform message notification is enabled. That is, based on the preference information in the user profile of the user of the initiating device and/or the intended recipient device, can be found to be enabled or disabled. If 415 notification is found to be enabled or on, or if optional determination 415 is not made, a plurality of possible recipient devices for the request can be determined 420. This determination can be based on user profile information from a user of the initiating end device or from the user of the recipient device. Determining 420 a plurality of possible recipient devices can comprise determining an identifier for each of the plurality of possible recipient devices stored in the user profile information from the user of the initiating end device or the recipient device and associated with the intended recipient device. The identifier can comprise a phone number, an email address, an Internet Protocol (IP) address, etc. According to one embodiment of the present invention, the plurality of possible recipient end devices can include the intended recipient device.

The request to initiate a communication can be forwarded 425 to each of the plurality of possible recipient devices at substantially the same time. Optionally, a determination 430 can be made as to whether one or more of the recipient devices has answered or acknowledged the request. That is, in some cases, such as an email, communications between the initiating device and the recipient devices need not be established other than delivery of the message. However, in other cases, such as a phone call, the initiating device and recipient device should be connected to allow communications. In such a case, once one of the recipient devices answers 430 or otherwise acknowledges the request for communications, the initiating device can be connected 435 to the recipient device for further communication, i.e., the phone call etc.

Figure 5:
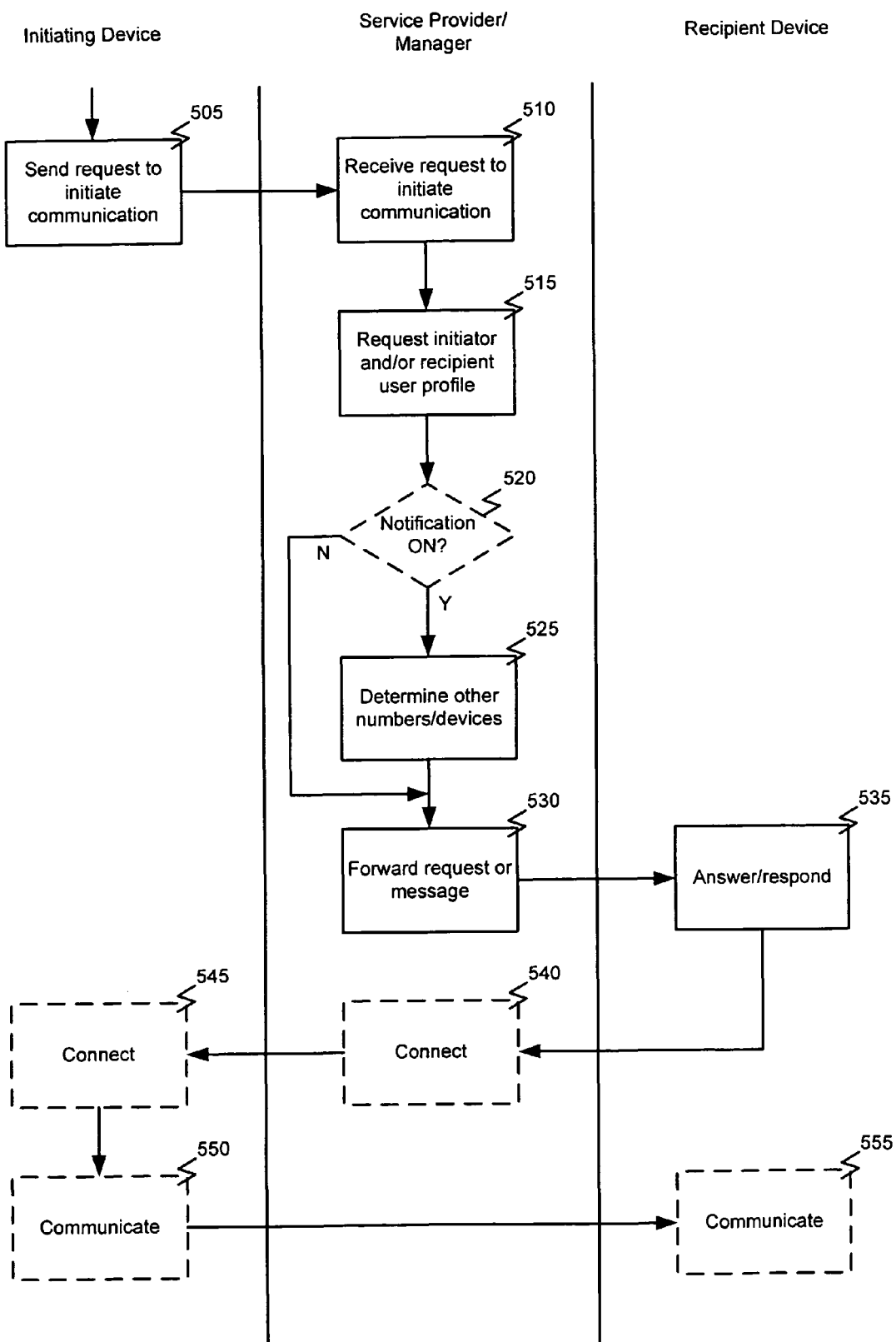
FIG. 5 is a flowchart illustrating additional details of a process for cross-platform message notification according to an embodiment of the present invention.

FIG. 5 is a flowchart illustrating additional details of a process for cross-platform message notification according to an embodiment of the present invention. This example represents a process that may be performed by the service provider system discussed above with reference to FIG. 1, one or more of the servers or managers of the network element layer discussed above with reference to FIG. 2, or another system or device depending upon the environment in which the methods are implemented and illustrates the processes performed by the initiating device as well as the recipient device.

In this example, the initiating device sends a request to initiate a communication to the service provider system or manager as described above. The implementing system, such as a service provider system, can receive 510 a request to initiate a communication from an initiating end device. The request can identify a single intended recipient device. Receiving a request to initiate a communication can comprises receiving a phone call to a single phone number, receiving a message to a single address such as an email message or an Instant Message (IM), etc. Based on this request, the system can lookup or read user profile information for the initiator and/or the recipient. That is, the cross-platform message notification can be based on either the initiator's preference information, the recipient's preference information, or some combination thereof.

Optionally, a determination 520 can be made as to whether cross-platform message notification is enabled. That is, based on the preference information in the user profile of the user of the initiating device and/or the intended recipient device, can be found to be enabled or disabled. If 520 notification is found to be enabled or on, or if optional determination 520 is not made, a plurality of possible recipient devices for the request can be determined 525. This determination can be based on user profile information from a user of the initiating end device or from the user of the recipient device. Determining 525 a plurality of possible recipient devices can comprise determining an identifier for each of the plurality of possible recipient devices stored in the user profile information from the user of the initiating end device and associated with the intended recipient device. The identifier can comprise a phone number, an email address, an Internet Protocol (IP) address, etc. According to one embodiment of the present invention, the plurality of possible recipient end devices can include the intended recipient device.

The request to initiate a communication can be forwarded 530 to each of the plurality of possible recipient devices at substantially the same time. One or more of the recipient devices can respond 535 to the message. In some cases, such as an email, communications between the initiating device and the recipient devices need not be established other than delivery of the message. However, in other cases, such as a phone call, the initiating device and recipient device should be connected to allow communications. In such a case, once one of the recipient devices answers 535 or otherwise acknowledges the request for communications, the initiating device can be connected 540 and 545 to the recipient device for further communication 550 and 555, i.e., the phone call etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing cross-platform message notification, the method comprising:
    receiving a request to initiate a communication comprising a first communication type from an initiating end device, the request identifying a single intended recipient device;
    determining, from a plurality of end devices, a plurality of possible recipient devices for the request to initiate a communication based on user profile information from a user of the initiating end;
    identifying a format of the communication;
    determining whether the format of the communication is in a common language format;
    notifying each of the plurality of possible recipient devices at substantially the same time of the request to initiate a communication;
    connecting the initiating end device to one of the plurality of possible recipient devices based on a response from at least one of the possible recipient devices;
    translating the communication from the common language format to a format that is compatible with the one of the plurality of possible recipient devices connected to the initiating end device;
    delivering the communication to the one of the plurality of possible recipient devices connected to the initiating end device, the communication delivered to the one of the plurality of possible recipient devices comprising a second communication type; and monitoring one or more periodic heartbeat messages sent from each of the plurality of end devices, indicating the normal status of that end device, each of the one or more heartbeat messages having the common language format.

2. The method of claim 1, wherein the plurality of possible recipient end devices includes the intended recipient device.

3. The method of claim 1, wherein receiving a request to initiate a communication comprises receiving a phone call to a single phone number.

4. The method of claim 1, wherein receiving a request to initiate a communication comprises receiving a message to a single address comprising a single intended recipient device.

5. The method of claim 4, wherein the message comprises an initiation communication email message.

6. The method of claim 4, wherein the message comprises an initiation communication Instant Message (IM).

7. The method of claim 1, further comprising determining from the user profile information of the user of the initiating end device whether cross-platform message notification is enabled prior to determining a plurality of possible recipient devices.

8. The method of claim 1, wherein determining a plurality of possible recipient devices comprises determining an identifier for each of the devices stored in the user profile information of the user of the initiating end device and each of the devices stored in the user profile information of the user of the intended recipient device.

9. The method of claim 8, wherein the identifier comprises a phone.

10. The method of claim 8, wherein the identifier comprises an email.

11. The method of claim 8, wherein the identifier comprises an Internet Protocol (IP) address.

12. A system for providing cross-platform message notification, the system comprising:
a communications bus;
a user profile database communicatively coupled with the communications bus and adapted to maintain user profile information for a plurality of users;
a plurality of end devices of different types, each end device communicatively coupled with the communications bus and adapted to:
send and receive common language messages via the communications bus using object-oriented programming techniques,
translate common language messages received from the communications bus to a format specific to the end device based on the type, and
to store user profile information in the user profile database;
a plurality of servers adapted to provide content and services to the plurality of end devices;
one or more managers, each manager communicatively coupled with the communications bus and the plurality of servers, wherein each manager is adapted to:
receive via the communications bus a request to initiate a communication comprising a first communication type from an initiating end device of the plurality of end devices, the request identifying a single intended recipient device of the plurality of end devices,
determine, from the plurality of end devices, a plurality of possible recipient devices for the request to initiate a communication from the plurality of end devices based on user profile information stored in the user profile database by a user of the intended recipient device,
communicate with at least one of the plurality of servers using object-oriented programming techniques,
notify each of the plurality of possible recipient devices at substantially a same time of the request to initiate a communication,
connect the initiating end device to one of the plurality of possible recipient devices based on a response from at least one of the possible recipient devices,
deliver the communication to the one of the plurality of possible recipient devices connected to the initiating end device, the communication delivered to the one of the plurality of possible recipient devices comprising a second communication type; and
monitor one or more periodic heartbeat messages sent from each of the plurality of end devices, indicating the normal status of that end device, each of the one or more heartbeat messages having the common language format.

13. The system of claim 12, wherein the plurality of possible recipient end devices includes the intended recipient device.

14. The system of claim 12, wherein receiving a request to initiate a communication comprises receiving a phone call to a single phone number.

15. The system of claim 12, wherein receiving a request to initiate a communication comprises receiving a message to a single address.

16. The system of claim 15, wherein the message comprises an initiation communication email message.

17. The system of claim 15, wherein the message comprises an initiation communication Instant Message (IM).

18. The system of claim 15, wherein determining a plurality of possible recipient devices for the request to initiate a communication comprises determining an identifier for each of the devices stored in the user profile information of the user of the initiating end device and each of the devices stored in the user profile information of the user of the intended recipient device, wherein the identifier comprises a phone number.

19. The system of claim 15, wherein determining a plurality of possible recipient devices for the request to initiate a communication comprises determining an identifier for each of the devices stored in the user profile information of the user of the initiating end device and each of the devices stored in the user profile information of the user of the intended recipient device, wherein the identifier comprises an email address.

20. The system of claim 15, wherein determining a plurality of possible recipient devices for the request to initiate a communication comprises determining an identifier for each of the devices stored in the user profile information of the user of the initiating end device and each of the devices stored in the user profile information of the user of the intended recipient device, wherein the identifier comprises an Internet Protocol (IP) address.

21. A non-transitory machine-readable medium having stored thereon a series of instructions for which, when executed by a processor, cause the processor to perform cross platform message notification by:
receiving a request to initiate a communication comprising a first communication type from an initiating end device, the request identifying a single intended recipient device;
determining, from a plurality of end devices, a plurality of possible recipient devices for the request to initiate a;

communication based on user profile information from a user of the initiating end device;

identifying a format of the communication determining whether the format of the communication is in a common language format;

notifying each of the plurality of possible recipient devices at substantially the same time of the request to initiate a communication; and connecting the initiating end device to one of the plurality of possible recipient devices based on a response from at least one of the possible recipient devices;

translating the communication from the common language format to a format that is compatible with the one of the plurality of possible recipient devices connected to the initiating end device;

delivering the communication to the one of the plurality of possible recipient devices connected to the initiating end device, the communication delivered to the one of the plurality of possible recipient devices comprising a second communication type; and monitoring one or more periodic heartbeat messages sent from each of the plurality of end devices, indicating the normal status of that end device, each of the one or more heartbeat messages having the common language format.

22. The machine-readable medium of claim 21, wherein the plurality of possible recipient end devices includes the intended recipient device.

23. The machine-readable medium of claim 21, wherein receiving a request to initiate a communication comprises receiving a phone call to a single phone number.

24. The machine-readable medium of claim 21, wherein receiving a request to initiate a communication comprises receiving a message to a single address comprising a single intended recipient device.

25. The machine-readable medium of claim 24, wherein the message comprises an initiation communication email message.

26. The machine-readable medium of claim 24, wherein the message comprises an initiation communication Instant Message (IM).

27. The machine-readable medium of claim 21, further comprising determining from the user profile information-of the user of the initiating end device whether cross-platform message notification is enabled prior to determining a plurality of possible recipient devices.

28. The machine-readable medium of claim 21, wherein determining a plurality of possible recipient devices comprises determining an identifier for each of the devices stored in the user profile information of the user of the initiating end device and each of the devices stored in the user profile information of the user of the intended recipient device.

29. The machine-readable medium of claim 28, wherein the identifier comprises a phone number.

30. The machine-readable medium of claim 28, wherein the identifier comprises an email address.

31. The machine-readable medium of claim 28, wherein the identifier comprises an Internet Protocol (IP) address.

32. The method of claim 1, wherein forwarding the request to initiate a communication to each of the plurality of possible recipient devices at substantially the same time comprises ringing a plurality of telephones at substantially the same time.

33. The method of claim 32, wherein, connecting the initiating end device to one of the plurality of possible recipient devices based on a response from at least one of the possible recipient devices comprises connecting the initiating device to the first of the plurality of telephones that answers the ringing.

34. The method of claim 1, wherein forwarding the request to initiate a communication to each of the plurality of possible recipient devices at substantially the same time comprises ringing at least one telephone number at substantially the same time as at least one message is generated at a recipient end device, the message comprising an indication that a call is being received at the telephone number.

* * * * *